No. 692,643. Patented Feb. 4, 1902.
A. S. ELMORE.
APPARATUS FOR SEPARATING MINERALS BY SELECTIVE ACTION OF OILS.
(Application filed Aug. 8, 1901.)
(No Model.)
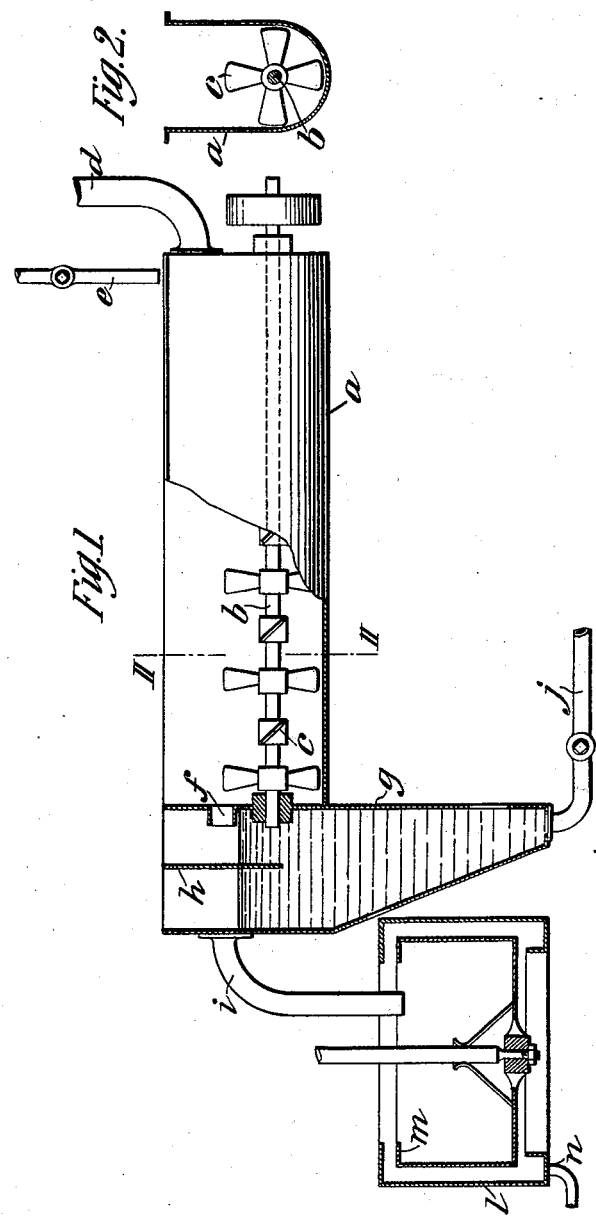

UNITED STATES PATENT OFFICE.

ALEXANDER S. ELMORE, OF LONDON, ENGLAND.

APPARATUS FOR SEPARATING MINERALS BY SELECTIVE ACTION OF OILS.

SPECIFICATION forming part of Letters Patent No. 692,643, dated February 4, 1902.

Application filed August 8, 1901. Serial No. 71,372. (No model.)

*To all whom it may concern:*

Be it known that I, ALEXANDER STANLEY ELMORE, a citizen of England, residing at 4 Bishopsgate street within, in the city of London, England, have invented a certain new and useful Apparatus for Separating Minerals by the Selective Action of Oils, of which the following is a specification.

This invention relates to apparatus for effecting the separation of minerals by the selective action of oils, as I shall describe, referring to the accompanying drawings.

Figure 1 is an elevation, partly sectional, of apparatus according to my invention. Fig. 2 is a transverse section on the line II II of Fig. 1.

$a$ is a trough having a rounded bottom, in which a shaft $b$, carrying a number of inclined agitating-blades $c$, is caused to revolve by any suitable power. Into one end of the trough leads a pipe $d$, by which pulverized ore or mineral mixed with five to ten times its volume of water is fed into the trough, while oil is fed by a pipe $e$ in quantity regulated by a cock. As the liquid mineral pulp and oil are caused by the blades $c$ to travel along the trough $a$ they become thoroughly mixed, and the mixture issues by an opening $f$ into a subsidence-tank $g$, which has in its upper part a partition $h$, extending down a little below the level of an outlet-pipe $i$. In the tank $g$ a separation takes place of the metallic from the rocky or earthy ingredients of the mixture, the metallic ingredients adhering to the oil and by it floated to the top on the left side of the partition $h$, while the earthy and rocky ingredients subside and are allowed to issue by a pipe $j$, provided with a regulating-cock. The metallic ingredients, with the oil, are discharged by the pipe $i$ into the drum $k$ of a centrifugal machine, which revolves rapidly in a casing $l$. The drum $k$ has an inwardly-projecting flange $m$ at its upper edge. As the drum revolves the metallic matters, owing to their density accumulate in an annular layer at the circumference of the drum, while the oil collects inside them and overflows over the flange $m$ into the casing $l$, whence it flows by a pipe $n$. From time to time the revolution of the drum is stopped and the metallic matter is removed from it.

Having thus described the nature of this invention and the best means I know of carrying the same into practical effect, I claim—

The combination in an apparatus for separating metallic from rocky constituents of ore, of a trough, a shaft adapted to revolve within said trough and provided with inclined blades, pipes for delivering oil and water to said trough, a subsidence-tank arranged at one end of said trough, extending below the same and communicating therewith, said tank adapted to receive the liquid mineral pulp and oil from said trough, a vertically-extending partition arranged in said tank at the top thereof for the purpose set forth, a centrifugal drum arranged at one side of said tank, a pipe connected to said tank and communicating with said drum for discharging therein the metallic ingredients and the oil, and a pipe connected to the tank for discharging therefrom the earthy and rocky ingredients.

In testimony whereof I have hereunto set my hand in presence of two subscribing witnesses.

A. S. ELMORE.

Witnesses:
 WALTER JAMES SKERTEN,
 GERALD L. SMITH.